(12) United States Patent
Soma et al.

(10) Patent No.: US 7,972,013 B2
(45) Date of Patent: Jul. 5, 2011

(54) LIGHT SOURCE HAVING A HOLDING UNIT WITH AIR SUPPLY PORT FOR COOLING AIR AND PROJECTOR

(75) Inventors: Shigeyasu Soma, Shiojiri (JP); Takeshi Takezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 675 days.

(21) Appl. No.: 12/070,532

(22) Filed: Feb. 19, 2008

(65) Prior Publication Data

US 2008/0218050 A1 Sep. 11, 2008

(30) Foreign Application Priority Data

Mar. 6, 2007 (JP) ................................. 2007-055192
Oct. 26, 2007 (JP) ................................. 2007-278537

(51) Int. Cl.
*G03B 21/18* (2006.01)
*G03B 21/26* (2006.01)
(52) U.S. Cl. ............................. 353/57; 353/60; 352/202
(58) Field of Classification Search .............. 353/57–61; 352/202; 362/373, 580, 547, 218, 264
See application file for complete search history.

(56) References Cited

U.S. PATENT DOCUMENTS 7,188,973 B2    3/2007   Katsuma

FOREIGN PATENT DOCUMENTS

| JP | 05-002146 U | 1/1993 |
| JP | 09-304835 A | 11/1997 |
| JP | 10-186517 A | 7/1998 |
| JP | 2004-239975 A | 8/2004 |
| JP | 2004-342599 | 12/2004 |
| JP | 2005-004131 | 1/2005 |
| JP | 2005-010505 A | 1/2005 |
| JP | 2005-070216 | 3/2005 |
| JP | 2005-070216 A | 3/2005 |
| JP | 2005-249930 A | 9/2005 |
| JP | 2006-106656 A | 4/2006 |

*Primary Examiner* — Francis M Legasse, Jr.
(74) *Attorney, Agent, or Firm* — AdvantEdge Law Group, LLC

(57) ABSTRACT

A light source includes an arc tube which emits light, a reflector which reflects the light emitted from the arc tube, and a holding unit which holds the reflector. The holding unit has an air supply port through which cooling air is introduced into the light source on the light emitting side of the arc tube, and a first rectifying portion which guides cooling air having been supplied from the air supply port and passed through the light emitting side of the arc tube toward an area above the arc tube.

12 Claims, 13 Drawing Sheets

LIGHT SOURCE HAVING A HOLDING UNIT WITH AIR SUPPLY PORT FOR COOLING AIR AND PROJECTOR

BACKGROUND

1. Technical Field

The present invention relates to a light source and a projector including the light source.

2. Related Art

A projector of a type which modulates light emitted from a light source to form an image and projects the formed image on a screen or the like is known. This projector includes a light source which has an arc tube and a reflector as a reflection mirror for reflecting light emitted from the arc tube. The arc tube has a light emitting portion containing a pair of electrodes, and sealing portions extending from both sides of the light emitting portion.

A light source having this structure in related art includes a cooling system which takes heat generation distribution of the arc tube into consideration so as to prevent loss of transparency and blacking and allow prolongation of life of the light source. For example, a technology currently proposed introduces cooling air into the light source and guides the introduced air toward the inside of the reflector by using a concave surface of a concave lens to cool an area around the arc tube (see JP-A-2005-70216). Another related-art cooling system has an air supply port on the reflector and guides air introduced through the air supply port from an area above the arc tube toward an area below the arc tube (see JP-A-2004-342599).

According to the technologies disclosed in JP-A-2005-70216 and JP-A-2004-342599, a flow path of cooling air to be introduced into the light source is formed such that the air passes the sealing members constituting the arc tube. However, there is a possibility that the air only cools a part of the arc tube depending on the structure of the flow path, resulting in non-uniform temperature distribution around the arc tube. In this case, the halogen cycle becomes inefficient, and thus loss of transparency or blacking of the arc tube is caused. Accordingly, these technologies are unsatisfactory as a cooling system. In addition, according to the cooling system disclosed in JP-A-2004-342599, the process of forming an opening on the reflector and producing the air supply port thereon is needed.

Furthermore, the technologies described above cannot provide an appropriate cooling condition inside the light source which is included in a projector suspended from the ceiling and installed upside down during use.

SUMMARY

It is an advantage of some aspects of the invention to provide a light source capable of appropriately cooling respective parts of an arc tube and maintaining uniform temperature distribution in the area around the arc tube so as to prevent loss of transparency and blacking of the arc tube and prolong the life of the light source. It is another advantage of some aspects of the invention to provide a light source capable of achieving appropriate cooling and prolonging life of the light source even when the light source is installed upside down during use.

A light source according to a first aspect of the invention includes an arc tube which emits light, a reflector which reflects the light emitted from the arc tube, and a holding unit which holds the reflector. The holding unit has an air supply port through which cooling air is introduced into the light source on the light emitting side of the arc tube, and a first rectifying portion which guides cooling air having been supplied from the air supply port and passed through the light emitting side of the arc tube toward an area above the arc tube. The light emitting side herein refers not only to a space extending from the arc tube on the side opposite to the reflector, but also to a space around the light emitting portion of the arc tube on the side opposite to the reflector.

According to the light source in the first aspect of the invention, cooling air introduced through the air supply port can flow toward the first rectifying portion so as not to directly cool particularly a light emitting portion of the arc tube. Moreover, the cooling air can flow toward an area above the arc tube by the function of the first rectifying portion. Generally, the heat generation distribution of the arc tube is not uniform, and the temperature of the upper part of the arc tube is higher than the temperature of the lower part. According to this structure, cooling air flows toward the upper part of the arc tube as a high temperature portion, and the cooling air heated by this portion flows toward the lower part of the arc tube as a low temperature portion. Thus, the temperature difference between the upper and lower parts of the arc tube can be reduced. In this case, the respective parts of the arc tube are appropriately cooled, and the temperature distribution around the arc tube is equalized. Accordingly, prevention of transparency loss or blacking of the arc tube and life prolongation of the light source can be achieved through efficient halogen cycle.

It is preferable that the arc tube contains a light emitting portion and sealing portions extending to both sides of the light emitting portion, and that the air supply port has a second rectifying portion which guides cooling air introduced into the light source toward the light emitting side of the arc tube, i.e., toward the outside. According to this structure, the cooling air introduced through the air supply port can flow toward the first rectifying portion while cooling the light emitting side sealing portion of the sealing portions extending from both sides of the arc tube.

It is preferable that the first rectifying portion is a curved surface or inclined surface formed on the inner wall of the holding unit. According to this structure, cooling air can flow toward an area above the arc tube along the curved surface or inclined surface formed on the inner wall of the holding unit.

It is preferable to further include a sub mirror disposed opposed to the reflection surface of the reflector to reflect a part of light emitted from the arc tube toward the arc tube. According to this structure, the area around the sub mirror can be cooled by the cooling air flowing toward the area above the arc tube by the function of the first rectifying portion, and therefore the temperature of the area around the sub mirror can be decreased.

It is preferable that the holding unit has an air exhaust port through which cooling air is exhausted at a position in the vicinity the side of the arc tube. According to this structure, the cooling air flowing from the upper part of the arc tube to the lower part can be efficiently exhausted from the side of the arc tube.

It is preferable that the first rectifying portion is disposed above the arc tube, and that the air supply port is located at a position below the arc tube and opposed to the first rectifying portion. According to this structure, the cooling air introduced from the position below the arc tube can flow toward the area above the arc tube to be introduced thereto.

It is preferable that the reflector has an ellipsoidal reflection surface. The light source which includes the reflector having the ellipsoidal reflection surface can provide light emitted from the arc tube and converging at a predetermined focus on the ellipsoidal surface. Thus, the system for cooling the respective parts of the arc tube can be disposed in the space around the converging light thus emitted.

It is preferable that the holding unit has the plural air supply ports and a switching unit which changes the flow of cooling air by opening or closing the plural air supply ports. According to this structure, the flow of cooling air can be changed according to the selected air supply port based on the use condition of the light source using the switching unit.

It is preferable that the switching unit has a plurality of open/close shutters disposed opposed to the plural air supply ports to open or close the respective air supply ports, which switching unit opens the open/close shutter disposed below the arc tube and closes the open/close shutter disposed above the arc tube to change the flow of cooling air. According to this structure, cooling air introduced through the open/close shutter of the plural open/close shutters positioned below the arc tube is initially guided toward the area above the arc tube, and the cooling air thus heated is directed toward the area below the arc tube.

It is preferable that the switching unit has a shutter ring for opening and closing the plural air supply ports, and changes the flow of cooling air by rotation of the shutter ring which locates an opening of the shutter ring at a position corresponding to the air supply port of the plural air supply ports disposed below the arc tube. According to this structure, the opening of the shutter ring corresponds to the air supply port disposed below the arc tube. Thus, cooling air initially passes through this air supply port and the opening and reaches the area above the arc tube, and then the cooling air thus heated flows to the area below the arc tube.

It is preferable that the shutter ring has the plural openings disposed at positions corresponding to the air supply port located below the arc tube and an air hole through which cooling air is exhausted. According to this structure, cooling air can be introduced into the light source through the air supply port, and then is exhausted to the outside of the light source through the air hole by the function of the shutter ring.

It is preferable that the air hole through which cooling air is exhausted is an exhaust port through which cooling air is exhausted to a position in the vicinity of the side of the arc tube. According to this structure, cooling air flowing from the area above the arc tube to the area below the arc tube can be efficiently exhausted from the side of the arc tube.

A projector according to a second aspect of the invention includes the light source described above. In the projector, light emitted from the light source is modulated according to image information to form image light. In this case, the projector includes the long-life light source.

It is preferable to further include a cooling fan unit which generates cooling air and introduces the cooling air into the holding unit. According to this structure, cooling air for cooling respective parts of the arc tube via the holding unit can be generated.

It is preferable that the cooling fan unit has a sirocco fan. According to this structure, the cooling fan is relatively compact, and is easily disposed at a position not blocking the optical path of the optical device.

It is preferable that the plural cooling fan units are provided at positions corresponding to the plural air supply ports. This structure can perform more effective cooling.

BRIEF DESCRIPTION OF THE DRAWINGS

The invention will be described with reference to the accompanying drawings, wherein like reference numbers are given to like elements.

DESCRIPTION OF EXEMPLARY EMBODIMENTS

First Embodiment

Figure 1:
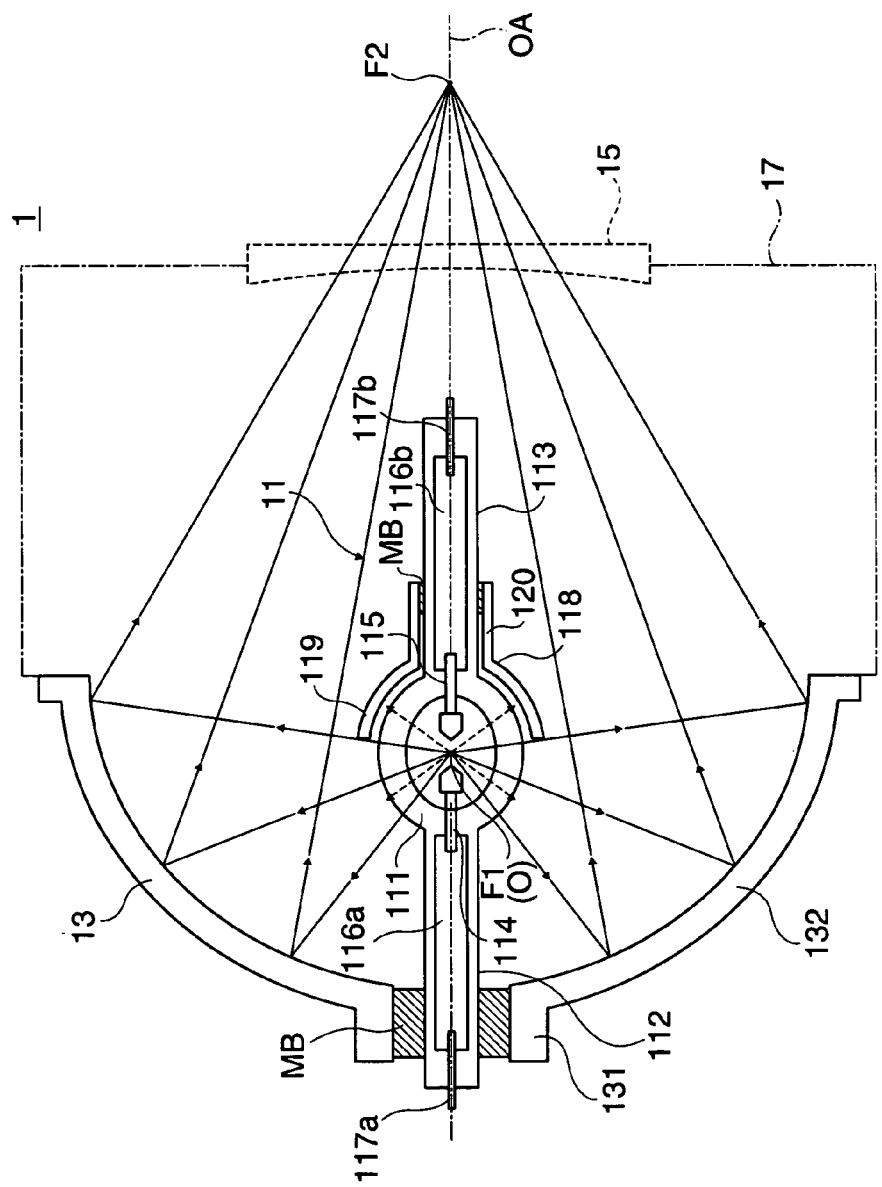
FIG. 1 is a cross-sectional view illustrating an inside structure of a light source according to a first embodiment.

FIG. 1 is a cross-sectional view illustrating an inside structure of a light source according to this embodiment. A light source 1 includes a lamp main body 11 as a discharge emitting type arc tube, an elliptic reflector 13 for reflecting light emitted from the lamp main body 11, and a concave lens 15 for collimating the light reflected by the reflector 13. In the light source 1, the light emitted from the lamp main body 11 passes the reflector 13 and the concave lens 15 to be collimated, and then is released toward the front. The reflector 13 and the lamp main body 11 supported by the reflector 13 constitute a lamp unit. The reflector 13 and the concave lens 15 are aligned and fixed to a housing 17 as an example of a holding unit (detailed structure of the housing will be described later).

The lamp main body 11 is formed by a quartz glass tube whose central area expands to the outside in a spherical shape. The lamp main body 11 has a light emitting portion 111 in the central area, and first and second sealing portions 112 and 113 extending from both sides of the light emitting portion 111. The lamp main body 11 is constituted by a metal halide lamp, high pressure mercury lamp, extra-high pressure mercury lamp, or other discharge emitting type lamp.

The tips of electrodes 114 and 115 made of tungsten disposed away from each other with a predetermined distance left therebetween, and gas involving mercury, rare gas, halogen and the like are sealed within the light emitting portion 111. Metal foils 116a and 116b made of molybdenum electrically connected with the roots of the electrodes 114 and 115 provided on the light emitting portion 111 are inserted into the sealing portions 112 and 113, respectively. The ends of the sealing portions 112 and 113 are closed by glass material or the like. When voltage is applied to leads 117a and 117b connected with the metal foils 116a and 116b, arc discharge is generated between the pair of the electrodes 114 and 115, and the light emitting portion 111 emits light having high luminance.

The light emitting side, i.e., substantially the front half of the light emitting portion 111 of the lamp main body 11 is covered by a sub reflection mirror 118. The sub reflection mirror 118 has a sub reflection portion 119 for returning light emitted toward the front from the light emitting portion 111 of the lamp main body 11 to the light emitting portion 111, and a support portion 120 fixed to the periphery of the second sealing portion 113 and supporting the root of the sub reflection portion 119. The inside glass surface of the sub reflection portion 119 is formed into a concave curve surface as an approximately spherical surface curving along the surface of the light emitting portion 111, and a reflection surface is formed on the surface of the sub reflection portion 119. The second sealing portion 113 is inserted into the support portion 120. Inorganic adhesive MB is injected into the clearance between the support portion 120 and the second sealing portion 113 to align and fix the sub reflection portion 119 to the light emitting portion 111.

The reflector 13 is a one piece body component made of heat resistance material such as crystallized glass which has a neck-shaped portion 131 into which the first sealing portion 112 of the lamp main body 11 is inserted and a main reflection portion 132 having an elliptical curve surface and extending from the neck-shaped portion 131. The first sealing portion 112 is inserted into the neck-shaped portion 131. Inorganic adhesive MB is injected into the clearance between the neck-shaped portion 131 and the first sealing portion 112 to align and fix the main reflection portion 132 to the light emitting portion 111. The inside glass surface of the main reflection portion 132 is formed into an elliptical curve surface, and a reflection surface is formed on the surface of the main reflection portion 132.

In the light source 1 having this structure, the lamp main body 11 is disposed along a system optical axis OA coinciding with the rotation symmetry axis of the main reflection portion 132 such that the light emitting center O between the electrodes 114 and 115 within the light emitting portion 111 is located at a first focus F1 on the ellipsoidal surface of the main reflection portion 132. When the lamp main body 11 is turned on, light emitted from the light emitting portion 111 is reflected by the main reflection portion 132, or reflected by the main reflection portion 132 via the sub reflection portion 119. Then, the reflected light converges at a second focus F2 on the ellipsoidal surface.

Figure 2A:
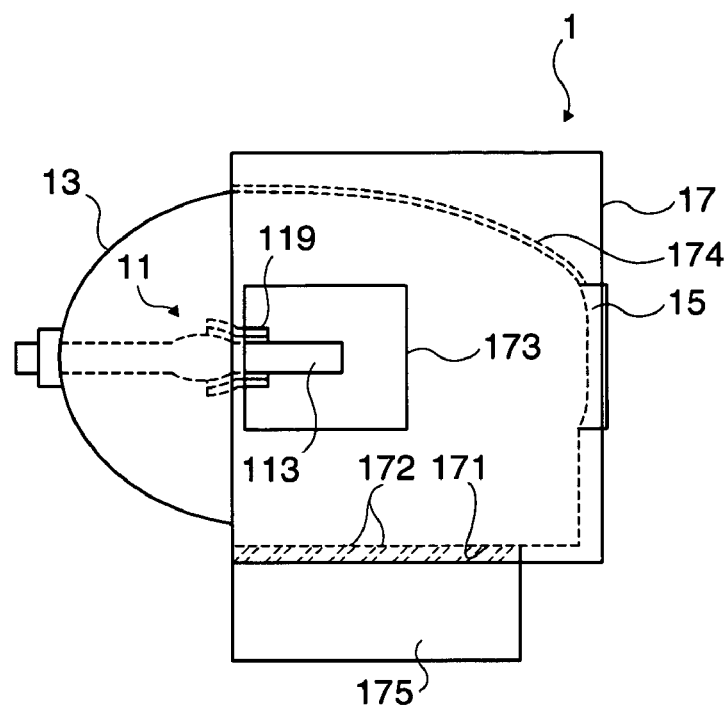
FIGS. 2A and 2B show a cooling system of the light source.
Figure 2B:
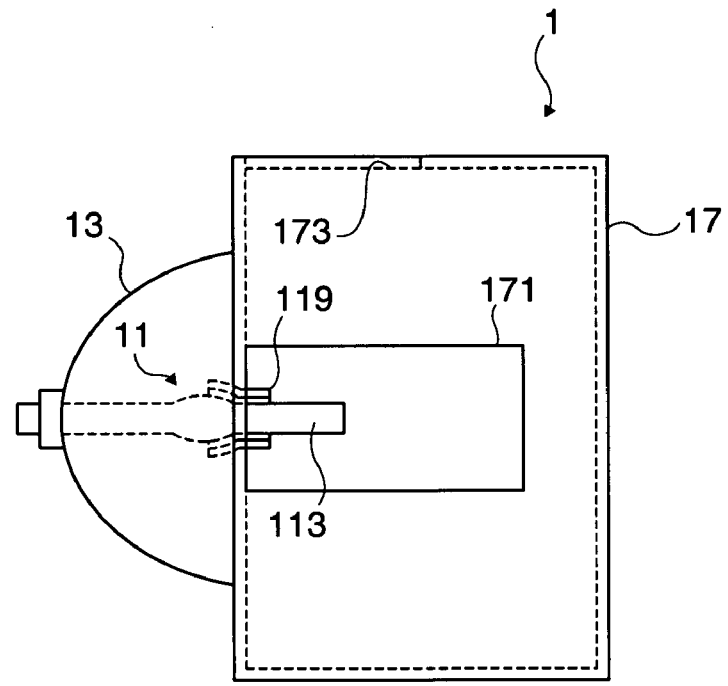

The light source 1 according to this embodiment has a cooling system which introduces cooling air into the light source 1 to cool the respective components of the lamp main body 11. FIGS. 2A and 2B show this cooling system. FIG. 2A is a side view schematically illustrating the left part of the light source 1 as viewed from the light emitting side, that is, from the front. FIG. 2B schematically illustrates the bottom of the light source 1.

As illustrating in FIGS. 2A and 2B, the light source 1 includes the housing 17 for fixing the reflector 13 and the concave lens 15. An air supply port 171 through which the inside and the outside of the housing 17 communicate with each other is formed on the bottom of the housing 17 at a position below the lamp main body 11. An air exhaust port 173 through which the inside and the outside of the housing 17 communicate with each other is formed on the left side as viewed from the light emitting side of the housing 17, that is, from the front side at a position in the vicinity of the side of the lamp main body 11. A rectifying plate 174 as a first rectifying portion for rectifying cooling air introduced through the air supply port 171 is provided on the inner wall of the upper surface of the housing 17 at a position opposed to the air supply port 171.

The cooling system of the light source 1 includes the air supply port 171, the air exhaust port 173, and the rectifying plate 174 provided on the housing 17, and a cooling fan 175 for supplying cooling air into the light source 1 through the air supply port 171. The air supply port 171 introduces cooling air into the light source 1. The air supply port 171 has a louver 172 as a second rectifying unit for controlling the direction of cooling air generated by the cooling fan 175, and the direction of cooling air is set in advance such that the air can flow toward the rectifying plate 174. The rectifying plate 174 is curved along the curve surface forming the inner wall of the upper surface of the housing 17 as illustrated in FIG. 2A such that the tangential direction of the rectifying plate 174 is inclined a predetermined angle with respect to the flow direction of the cooling air flowing toward the rectifying plate 174. The rectifying plate 174 directs the flow of the cooling air introduced through the air supply port 171 toward the lamp main body 11 along the shape of the curve surface of the rectifying plate 174 so as to introduce the cooling air into the reflector 13.

Figure 3:
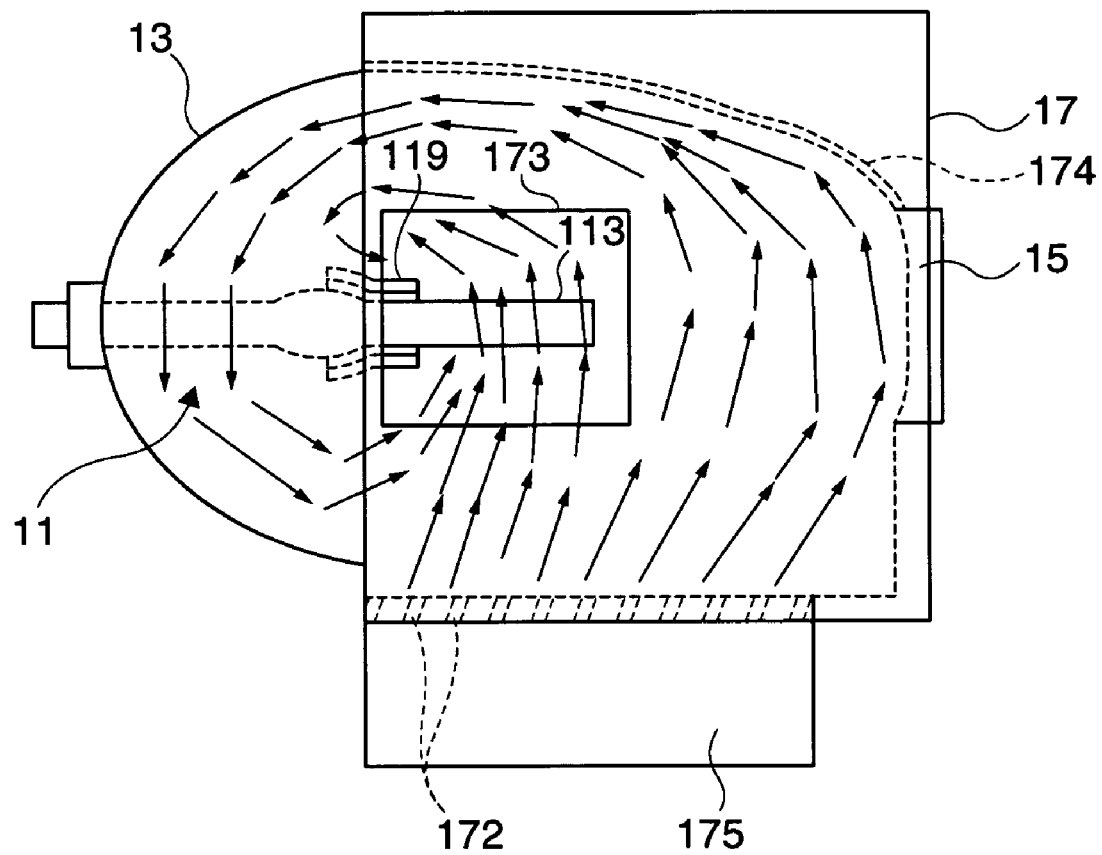
FIG. 3 shows a flow path of cooling air.

FIG. 3 is a side view schematically illustrating the light source 1, indicating the flow path of the cooling air introduced by the cooling system discussed above by arrows. As illustrated in FIG. 3, cooling air generated by the cooling fan 175 is introduced through the air supply port 171 on the bottom surface of the housing 17, and flows toward the rectifying plate 174 provided on the upper surface of the housing 17 by the function of the louver 172. In this step, the cooling air initially flows through the second sealing portion 113 extending from the light emitting portion 111 to cool the second sealing portion 113. Then, the cooling air having reached the rectifying plate 174 is introduced to the inside of the reflector 13 to cool the respective parts in the upper portion of the lamp main body 11. A part of the cooling air having introduced to the inside of the reflector 13 flows toward an area around the sub reflection mirror 118 to cool the respective parts around the sub reflection mirror 118. The cooling air having cooled the parts in the upper portion of the lamp main body 11 is guided along the ellipsoidal of the reflector 13 toward an area below the lamp main body 11, and is exhausted through the exhaust port 173.

In the cooling system having this structure, cooling air introduced through the bottom surface of the housing 17 cools the second sealing portion 113. Then, the cooling air is introduced to the area above the lamp main body 11, flows to the area below the lamp main body 11, and is exhausted through the exhaust port 173. According to this structure, the cooling air initially flows toward the area above the lamp main body 11 as a high temperature part, and then the cooling air heated by this area flows toward the area below the lamp main body 11 as a low temperature part. Also, a part of the cooling air introduced to the inside of the reflector 13 flows around the sub reflection mirror 118. In this case, the respective parts in the upper portion of the lamp main body 11 can be sufficiently cooled to lower the temperature thereat, and also excessive temperature drop at the respective parts in the lower portion of the lamp main body 11 can be prevented. Thus, the entire lamp main body 11 can be appropriately cooled while reducing the temperature difference between the upper portion and lower portion of the lamp main body 11. Accordingly, loss of transparency and blacking of the light emitting portion 111 of the lamp main body 11 can be prevented by efficient halogen cycle thus achieved, and life of the light source 1 can be prolonged.

The cooling air introduced through the air supply port 171 initially flows toward the rectifying plate 174, and then flows toward the area above the lamp main body 11 by the function of the rectifying plate 174. Thus, the respective parts in the upper portion of the lamp main body 11 can be cooled not excessively but only appropriately. Furthermore, since the air supply port 171 through which cooling air is introduced is formed on the opening provided on the housing 17, the necessity for forming an opening on the reflector 13 through which cooling air is introduced can be eliminated.

While the light source 1 rectifies cooling air by using the rectifying plate 174 curved along the curve surface shape of the inner wall in the upper portion of the housing 17 to introduce the cooling air to the inside of the reflector 13, the following modifications may be made.

Figure 4A:
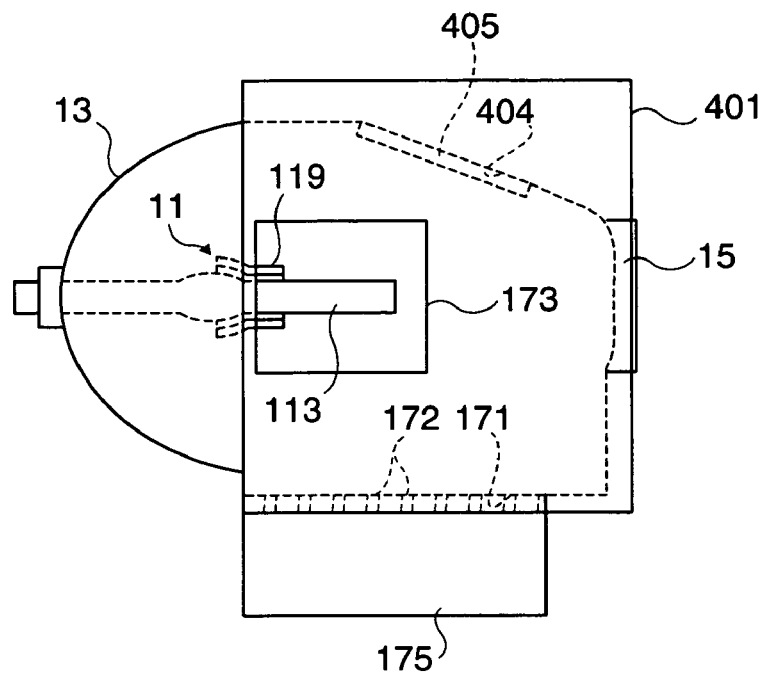
FIGS. 4A and 4B illustrates a structure of a housing according to a modified example.
Figure 4B:
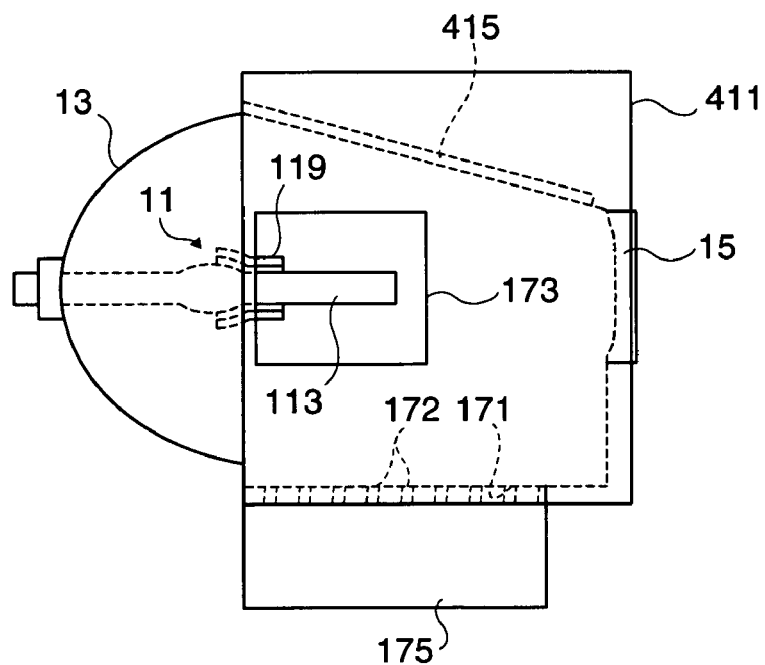

FIGS. 4A and 4B illustrate modified examples of a structure of a housing 401. According to the example shown in FIG. 4A, an inclined surface 404 having a predetermined inclination angle is formed on the inner wall of the upper surface of the housing 401 at a position opposed to the flow direction of cooling air introduced through the air supply port 171, and a rectifying plate 405 is fixed to the surface of the inclined surface 404. By the function of the rectifying plate 405, the cooling air introduced through the air supply port 171 flows toward the lamp main body 11 to be introduced to the inside of the reflector 13. According to the modified example shown in FIG. 4B, the inner wall of the upper surface of a housing 411 is formed to have a predetermined inclination angle to the bottom surface of the housing 411, and a rectifying plate 415 is inclined along the inner wall. By the function of the rectifying plate 415, cooling air introduced through the air supply port 171 flows toward the lamp main body 11 to be introduced to the inside of the reflector 13.

Figure 5:
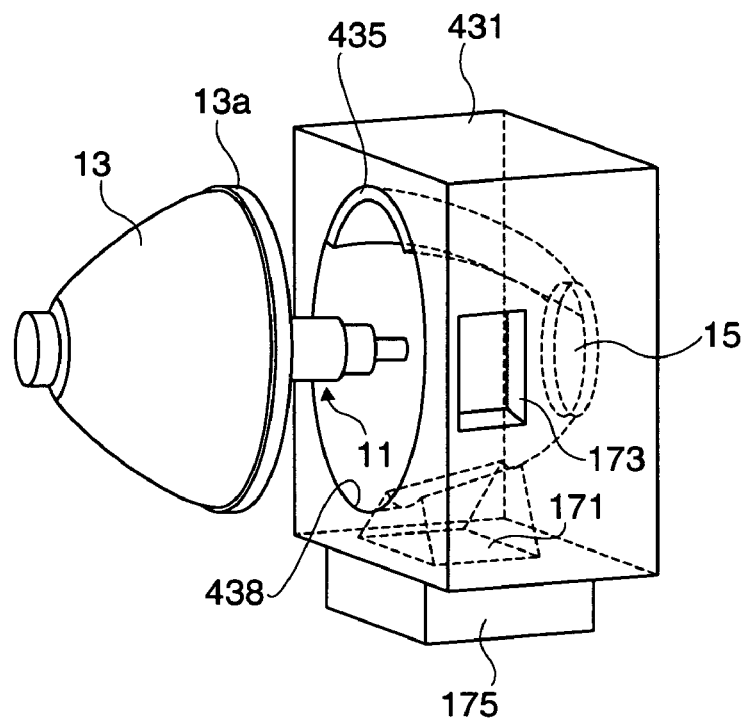
FIG. 5 illustrates a structure of a housing according to another modified example.

Alternatively, the following modification may be made. FIG. 5 illustrates a structure of a housing 431. According to the example shown in FIG. 5, an opening 438 is formed on the side surface of the housing 431 on the light entrance side, and an end 13a of the reflector 13 is inserted into and held by the opening 438. The inner wall of the upper surface of the housing 431 is formed into a curved shape corresponding to the curvature of the end 13a of the reflector 13. A space in the upper region inside the housing 431 communicates with the end 13a of the reflector 13 via the opening 438. A rectifying plate 435 is curved along the inner wall. In this structure, the cooling air passing through the rectifying plate 435 can be securely introduced to the inside of the reflector 13 to be directed toward the area above the arc tube.

Figure 6:
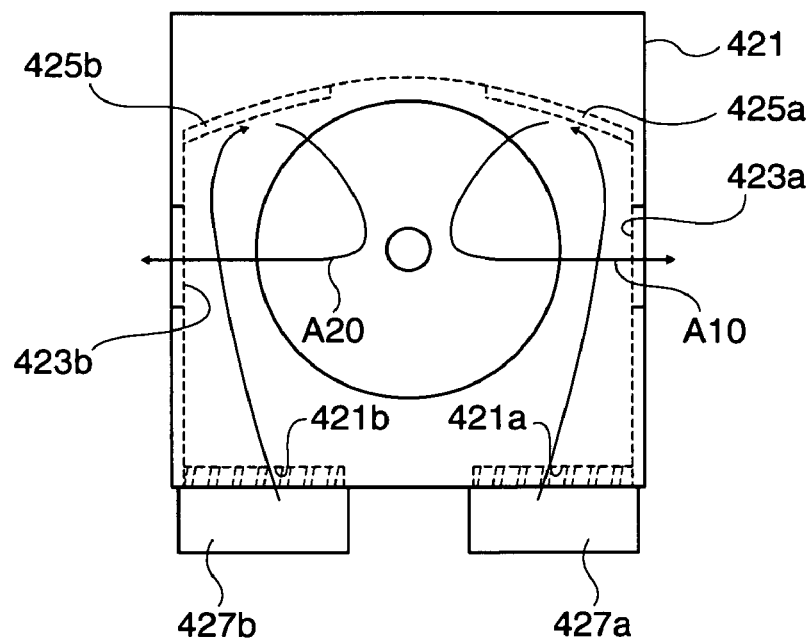
FIG. 6 shows a cooling system of a light source according to a modified example.

According to the first embodiment, the air supply port 171 is disposed below the lamp main body 11, and the rectifying plate 174 is disposed at a position opposed to the air supply port 171 and above the lamp main body 11. However, the following modification may be made. FIG. 6 shows a modified example of a cooling system included in a light source as a front view schematically showing the light source. According to this modified example, two air supply ports 421a and 421b connecting the inside and outside of a housing 421 are provided on the bottom surface of the housing 421, and rectifying plates 425a and 425b for rectifying cooling air introduced through the air supply ports 421a and 421b are provided on the inner wall of the upper surface of the housing 421 at positions opposed to the air supply ports 421a and 421b. Exhaust ports 423a and 423b connecting the inside and outside of the housing 421 are formed on the left side surface and the right side surface, respectively, as viewed from the light emitting side.

The cooling system according to this modified example has the air supply ports 421a and 421b, the air exhaust ports 423a and 423b, the rectifying plates 425a and 425b provided on the housing 421, and cooling fans 427a and 427b for supplying cooling air into the light source 1 via the air supply ports 421a and 421b. As indicated by an arrow A10 shown in FIG. 6, the cooling air generated by the cooling fan 427a is introduced through the air supply port 421a on the bottom surface of the housing 421, and flows toward the rectifying plate 425a provided on the upper surface of the housing 421 opposed to the air supply port 421a. Then, the cooling air flows to the area above the lamp main body 11 by the function of the rectifying plate 425a to cool the respective parts in the upper portion of the lamp main body 11, thereafter the air is guided to the area below the lamp main body 11 and its vicinity and discharged through the air exhaust port 423a. Similarly, as indicated by an arrow A20 in FIG. 6, the cooling air generated by the cooling fan 427b is introduced through the air supply port 421b on the bottom surface of the housing 421, and flows toward the rectifying plate 425b provided on the upper surface of the housing 421 opposed to the air supply port 421b. Then, the cooling air flows to the area above the lamp main body 11 by the function of the rectifying plate 425b to cool the respective parts in the upper portion of the lamp main body 11, thereafter the air is guided to the area below the lamp main body 11 and its vicinity and discharged through the air exhaust port 423b.

The reflector 13 included in the light source 1 discussed above may be a parabolic surface. In this case, the concave lens 15 can be eliminated.

While the rectifying plates 174, 415, 435, 425a, and 425b are separated from the housings 17, 401, 411, 431, and 421 in the light source 1, rectifying plates having the same structures as those of the rectifying plates 174, 415, 435, 425a, and 425b may be formed integrally with the interior of the housings 17, 401, 411, 431, and 421.

Second Embodiment

Figure 7:
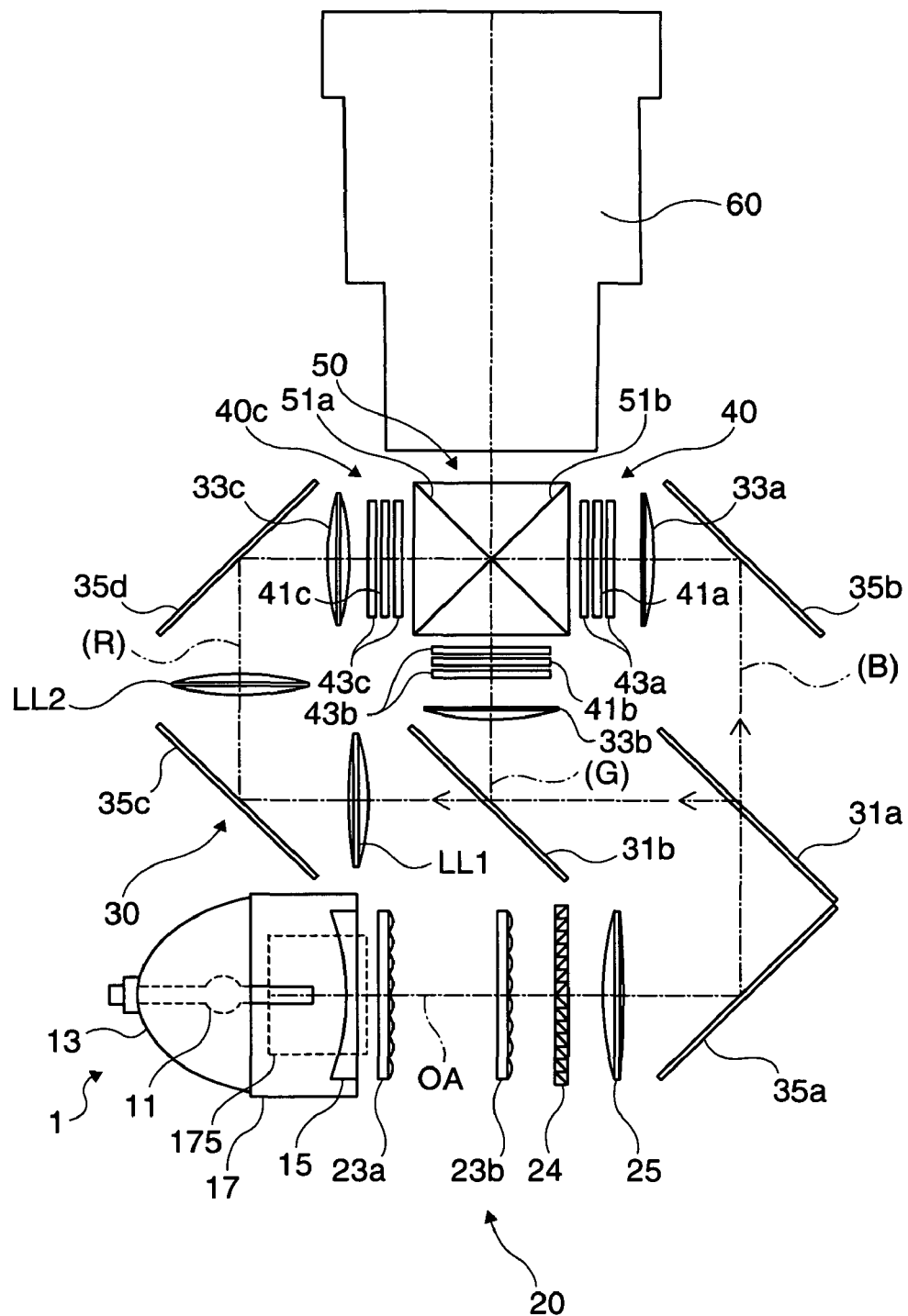
FIG. 7 shows a concept of a structure of optical systems included in a projector according to a second embodiment which contains the light source according to the first embodiment.

FIG. 7 schematically illustrates optical systems of a projector including the light source described in the first embodiment. A projector 200 in this embodiment includes the light source 1 shown in FIG. 1, an equalization system 20 for equalizing light before emission, a color separation system 30 for separating the light having passed through the equalization system 20 into three color lights of red, green and blue, a light modulation unit 40 receiving the lights in respective colors released from the color separation system 30, a cross dichroic prism 50 for combining image lights in respective colors released from the light modulation unit 40, and a projection lens 60 as a projection system for projecting the image light having passed through the cross dichroic prism 50 onto a not-shown screen. These systems are sequentially disposed along an optical axis OA.

As described in the first embodiment, the light source 1 has the lamp main body 11, the reflector 13, the concave lens 15, and the housing 17 (401, 411, 431, 421) for fixing the reflector 13 and the concave lens 15. The light source 1 also has the cooling system explained with reference to FIGS. 2A and 2B so as to cool the respective parts of the lamp main body 11 to an appropriate level and equalize the temperature distribution around the lamp main body 11.

The equalization system 20 has a pair of first lens array 23a and second lens array 23b, a polarization conversion member 24, and a superimposing lens 25. Each of the first lens array 23a and the second lens array 23b is constituted by a plurality of element lenses disposed in matrix. Light emitted from the light source 1 is divided into partial lights by these element lenses, and the divided lights are converged and diverged. The polarization conversion member 24 converts the light released from the second lens array 23b into only S-polarized components perpendicular to the sheet surface of FIG. 7, for example, and supplies the converted lights to the subsequent optical system. The superimposing lens 25 appropriately converges the light having passed through the polarization conversion member 24 as a whole. The light having passed through the superimposing lens 25 passes through the color separation system 30 and uniformly illuminates liquid crystal panels 41a, 41b and 41c in respective colors provided on the light modulation unit 40 with superimposition.

The light separation system 30 has first and second dichroic mirrors 31a and 31b, three field lenses 33a, 33b and 33c as correction system, and reflection mirrors 35a, 35b, 35c and 35d. The first dichroic mirror 31a reflects red light and green light of red, green and blue lights and transmits blue light, for example. The second dichroic mirror 31b reflects the green light of the received red and green lights and transmits the red light, for example. In the color separation system 30, the light in substantially white emitted from the light source 1 enters the first dichroic mirror 31a after its optical path is bended by the reflection mirror 35a. Then, the blue light having passed through the first dichroic mirror 31a passes through the reflection mirror 35b as S-polarized light without change, and enters the field lens 33a, for example. The green light reflected by the first dichroic mirror 31a and further reflected by the second dichroic mirror 31b enters the field lens 33b as S-polarized light without change, for example. The red light having passed through the second dichroic mirror 31b passes through lenses LL1 and LL2 and the reflection mirrors 35c and 35d as S-polarized light without change, and enters the field lens 33c for controlling the incident angle. The lenses LL1 and the LL2 and the field lens 33c constitute a relay system. The relay system has a function of supplying an image of the first lens LL1 to the field lens 33c via the second lens LL2 substantially without change.

The light modulation unit 40 has three liquid crystal panels 41a, 41b and 41c, and three pairs of polarization filters 43a, 43b and 43c between each pair of which the corresponding liquid crystal panel 41a, 41b or 41c is interposed. The blue light liquid crystal panel 41a and the pair of the polarization filter 43a, 43a between which the liquid crystal panel 41a is interposed constitute a blue light liquid crystal light valve for two-dimensionally modulating luminance of blue light of light from the light source according to image information. Similarly, the green light liquid crystal panel 41b and the corresponding polarization filters 43b and 43b constitute a green light liquid crystal light valve, and the red light liquid crystal panel 41c and the polarization filters 43c, 43c constitute a red light liquid crystal light valve.

Blue light branched after reflection by the first dichroic mirror 31a of the color separation system 30 enters the blue light liquid crystal panel 41a via the field lens 33a. Green light branched after reflection by the second dichroic mirror 31b of the color separation system 30 enters the green light liquid crystal panel 41b via the field lens 33b. Red light branched after transmission through the second dichroic mirror 31b of the color separation system 30 enters the red light liquid crystal panel 41c via the field lens 33c. The three color lights having entered the respective liquid crystal panels 41a, 41b and 41c are modulated according to a driving signal or an image signal inputted as an electric signal to the respective liquid crystal panels 41a, 41b and 41c. In this step, the polarization directions of the lights entering the liquid crystal panels 41a, 41b and 41c are accurately controlled by the polarization filters 43a, 43b and 43c, and component lights having predetermined polarization directions are extracted as image lights from the modulated lights released from the respective liquid crystal panels 41a, 41b and 41c.

The cross dichroic prism 50 is a light combining member which has a substantially square shape in the plan view formed by affixing four rectangular prisms. A pair of dielectric multilayer films 51a and 51b crossing each other in X shape are provided on the boundaries of the affixed rectangular prisms. The first dielectric multilayer film 51a reflects blue light, and the second dielectric multilayer film 51b reflects red light. The cross dichroic prism 50 reflects blue light received from the liquid crystal panel 41a by the first dielectric multilayer film 51a such that the blue light can be released to the right with respect to the traveling direction. The cross dichroic prism 50 directs green light received from the liquid crystal panel 41b to advance straight and to be released via the first and second dielectric multilayer films 51a and 51b. The cross dichroic prism 50 reflects red light received from the liquid crystal panel 41c by the second dielectric multilayer film 51b such that the red light can be released to the left with respect to the traveling direction.

The projection lens 60 projects a color image light produced by combining at the cross dichroic prism 50 onto the screen with desired magnification. More specifically, a color dynamic image or color still image having the desired magnification corresponding to the driving signal or image signal inputted to the respective liquid crystal panels 41a, 41b and 41c is projected on the screen.

The projector 200 having this structure uses the light source 1 shown in the first embodiment which has long life. Thus, the number of replacement of the light source can be decreased.

According to the projector 200 described above, it is possible to provide the cooling fan 175 or cooling fans 427a and 427b of the light source 1 on the projector 200 side, and connect the cooling fan 175 and the air supply ports 171, 421a and 421b by duct.

While the equalization system 20 of the projector 200 has the pair of the first and second lens arrays 23a and 23b, the polarization conversion member 24, and the superimposing lens 25, the components such as the first and second lens arrays 23a and 23b and the polarization conversion member 24 may be eliminated. It is also possible to replace the first and second lens arrays 23a and 23b with a rod integrator.

According to the projector 200, the cross dichroic prism 50 combines respective color images after color separation by using the color separation system 30 and modulation of the respective color lights by using the light modulation unit 40. However, the structure of the projector 200 is applicable to a projector which modulates light by a single liquid crystal panel, a projector which modulates light by two liquid crystal panels, and a projector which modulates light by four or a larger number of liquid crystal panels.

It is possible to perform light modulation and combination of respective color lights by using a combination of a color wheel illuminated by the light source 1 and the equalization system 20 and a digital micromirror device receiving light transmitted through the color wheel instead of using the color separation system 30 and the light modulation unit 40.

While a transmission type projector has been discussed in the second embodiment, the structure in this embodiment is applicable to a reflection type projector. The "transmission type" herein refers to a type in which liquid crystal light valve containing a liquid crystal panel and the like transmits light. The "reflection type" is a type in which a liquid crystal light valve reflects light.

There are a front type projector which projects images in the same direction as the direction for observing the screen, and a rear type projector which projects images in the direction opposite to the screen observing direction. The structure according to this embodiment is applicable to both of these types of projector.

Third Embodiment

Figure 8A:
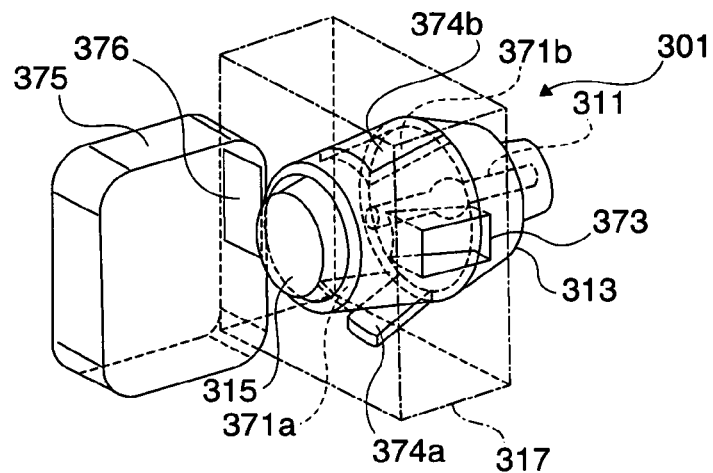
FIGS. 8A through 8C show a cooling system of a light source according to a third embodiment.
Figure 8B:
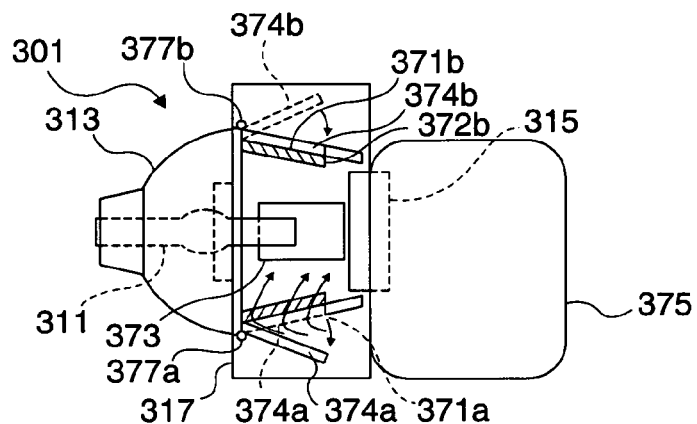
Figure 8C:
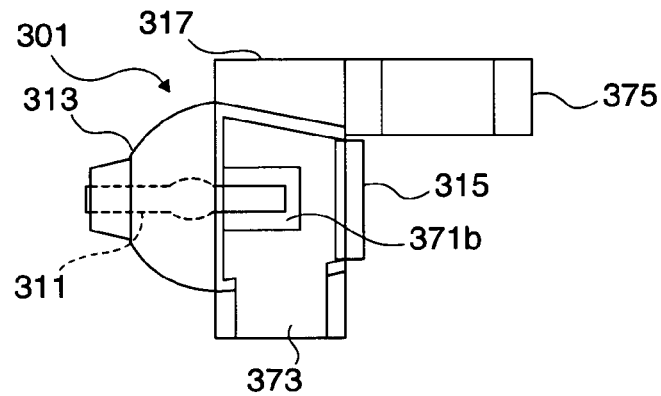

FIGS. 8A, 8B and 8C show a light source and its cooling system according to a third embodiment. FIG. 8A is a perspective view schematically illustrating the light source, FIG. 8B is a left side view schematically illustrating the light source as viewed from the light emitting side, i.e., from the front, and FIG. 8C is a bottom view schematically illustrating the light source. In these figures, FIGS. 8B and 8C contain partial cross sections at the position of the housing. The optical structure of the light source in this embodiment is similar to that of the light source according to the first embodiment, and therefore detailed explanation of parts other than the cooling system is not repeated.

As illustrated in FIGS. 8A through 8C, a light source 301 includes a housing 317 for fixing a reflector 313 and a concave lens 315. Air supply ports 371a and 371b through which the inside and outside of the housing 317 communicate with each other are formed on the housing 317 at a position below a lamp main body 311 and a position opposed to the position below the lamp main body 311, that is, a position above the lamp main body 311. While FIGS. 8A through 8C show the light source 301 installed in the normal condition, the light source 301 may be installed upside down. When the light source 301 is positioned upside down, the air supply port 371b is disposed at a position below the lamp main body 311. An air supply port 376, through which cooling air generated by a cooling fan 375 attached from the outside is introduced into the housing 317, is formed on the left front part of the housing 317 as viewed from the light emitting side, i.e., from the front. The cooling fan 375 is a sirocco fan, for example, and is incorporated in an apparatus such as projector to which the light source 301 is attached. The cooling fan 375 is connected with the light source 301 via the air supply port 376 to introduce cooling air from the air supply port 376 into the housing 317. Thus, the cooling fan 375 functions as a cooling fan unit for generating cooling air and introducing the air into the housing 317. An air exhaust port 373 through which the inside and outside of the housing 317 communicate with each other is formed on the right side surface of the housing 317 as viewed from the light emitting side, i.e., from the front at a position in the vicinity of the side of the lamp main body 311.

A pair of open/close shutters 374a and 374b for opening and closing the air supply ports 371a and 371b are provided on the light source 301 at positions opposed to the corresponding air supply ports 371a and 371b. The pair of open/close shutters have hinges 377a and 377b at the light source side edges, and are attached in such conditions as to be rotatable with their fulcrums located at the edges. The pair of open/close shutters 374a and 374b open or close the corresponding air supply ports 371a and 371b by the gravity of the shutters 374a and 374b to open only either the air supply port 371a or 371b. More specifically, when the light source 301 is disposed with the air supply port 371a located at the lower position as illustrated in FIG. 8B, the open/close shutter 374a located below the lamp main body 311 rotates from a position indicated by a dotted line toward a position indicated by a solid line by the gravity of the shutter 374a. As a result, the open/close shutter 374a opens the air supply port 371a. In this condition, the open/close shutter 374b located above the lamp main body 311 rotates by the gravity of the shutter 374b and closes the air supply port 371b. Thus, cooling air is introduced only through the air supply port 371a of the air supply ports 371a and 371b into the light source 301. At this time, the flow direction of the cooling air introduced through the air supply port 371a is controlled by the louver 372a as the second rectifying portion. The open/close shutter 374b which closes the air supply port 371b functions as a part of the first rectifying portion for rectifying the cooling air introduced through the air supply port 371a into the light source 301. Thus, the first rectifying portion constituted by the open/close shutter 374b and its surrounding parts forms the flow path of the cooling air introduced through the air supply port 371a.

When the light source 301 is positioned upside down, the respective open/close shutters 374a and 374b rotate toward the positions indicated by dotted lines shown in FIG. 8B in the direction opposite to the direction in the above example. As a result, the air supply port 371b is opened, and the air supply port 371a is closed. In this case, cooling air is introduced only through the air supply port 371b to the inside while the flow direction of the cooling air is controlled by the louver 372b as the second rectifying portion. Accordingly, the pair of the open/close shutters 374a and 374b function as switching devices for changing flow of cooling air by opening and closing the air supply ports 371a and 371b.

Figure 9:
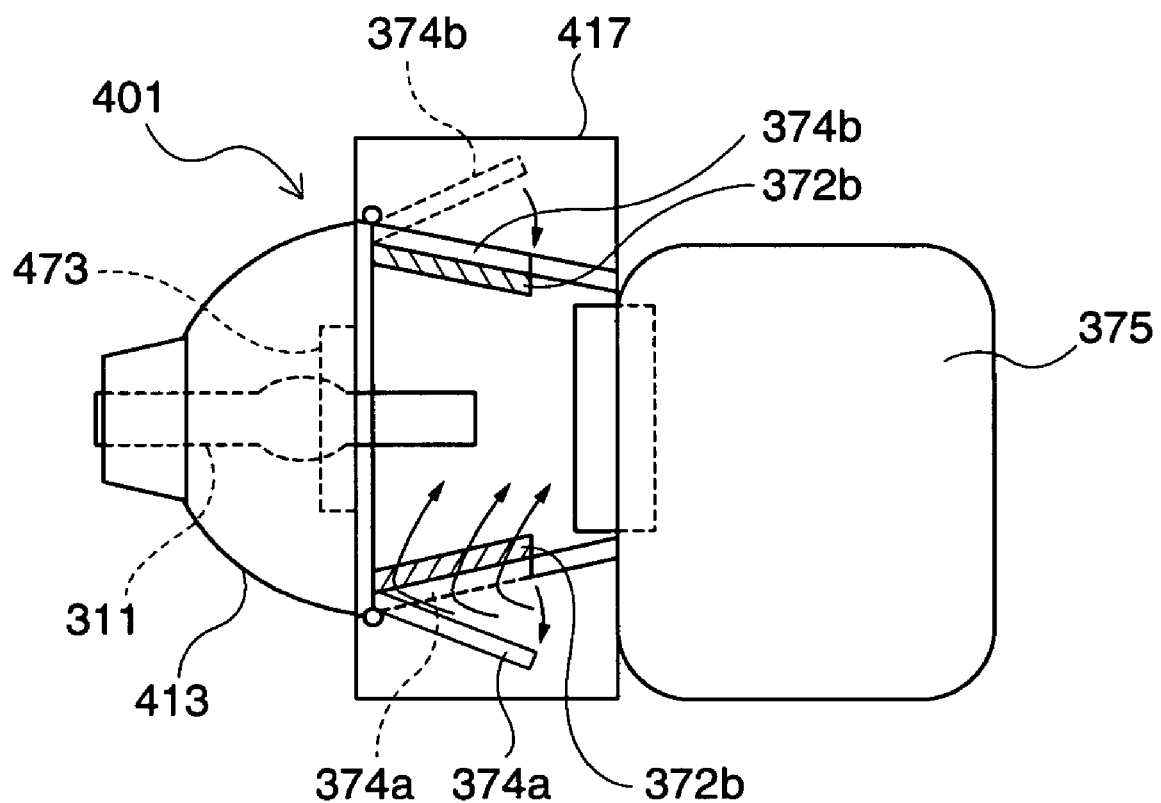
FIG. 9 shows a structure of a light source according to a modified example.

FIG. 9 illustrates a concept of a light source according to a modified example of this embodiment, schematically showing the left side of the light source as viewed from the light emitting side, i.e., from the front. FIG. 9 contains a partial cross section at the position of the housing. A light source 401 in this modified example has an air exhaust port 473 through which the inside and outside communicate with each other is provided not on the housing 417 but on the side surface of the reflector 413. That is, according to this modified example, the air exhaust port 473 through which the inside and the outside of the reflector 413 communicate with each other is formed on the right side surface of the reflector 413 as viewed from the light emitting side, i.e., from the front. Structures other than the position of the air exhaust port 473 are similar to those of the light source 301 in FIGS. 8A through 8C, and the same explanation is not repeated herein.

Figure 10A:
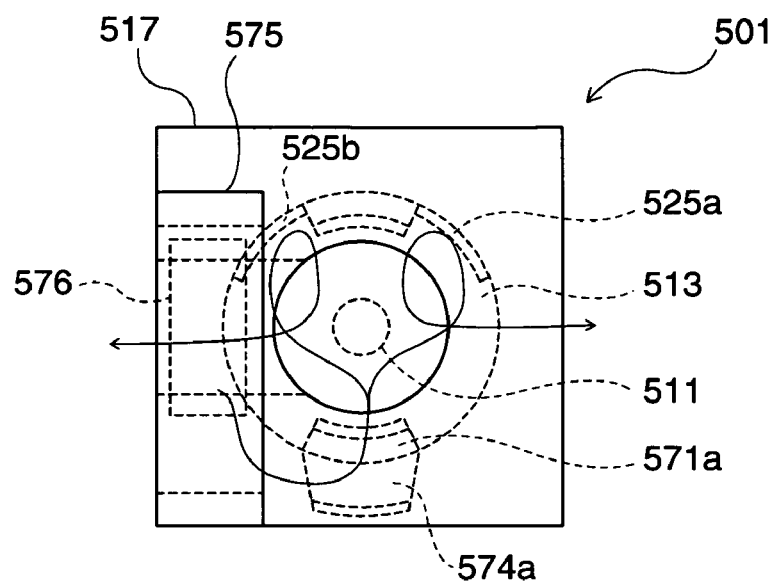
FIGS. 10A and 10B show a structure of a housing according to a modified example.
Figure 10B:
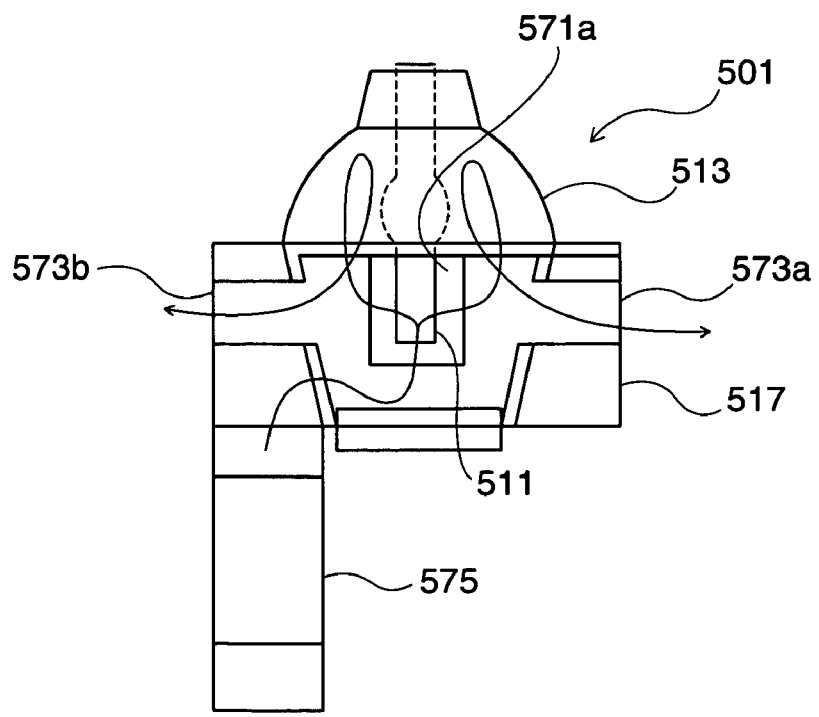

FIGS. 10A and 10B show a cooling system of a light source according to a modified example. FIG. 10A is a front view schematically illustrating the light source. FIG. 10B schematically illustrates the upper surface of the light source. FIG. 10B contains a partial cross section at the position of the housing. According to this modified example, a light source 501 has air exhaust ports 573a and 573b through which the inside and outside of a housing 517 communicate with each other are formed on the left and right side surfaces as viewed from the light emitting side. Structures other than the position of the air exhaust ports 573a and 573b are similar to those of the light source 301 in FIGS. 8A through 8C, and the same explanation is not repeated herein.

The cooling system according to this modified example includes an air supply ports 571a, the air exhaust ports 573a and 573b, and rectifying plates 525a and 525b provided on the housing 517, and supplies cooling air into the light source 501 via the air supply ports 571a and 571b. In this case, cooling air is supplied by using a cooling fan 575 as an external device attached to a position corresponding to an air supply port 576. As indicated by arrows in FIGS. 10A and 10B, cooling air introduced through the air supply port 576 toward the housing 517 by using the cooling fan 575 is separated into left and right parts and introduced from the air supply port 571a on the lower surface side of the housing 517 into the light source 501. Then, the cooling air flows toward the rectifying plates 525a and 525b on the upper surface side of the housing 517 opposed to the air supply port 571a.

Subsequently, the cooling air is guided from an area above a lamp main body 511 toward an area below the lamp main body 511 and its vicinity by the function of the rectifying plates 525a and 525b, and then is discharged through the exhaust ports 573a and 573b.

Fourth Embodiment

Figure 11A:
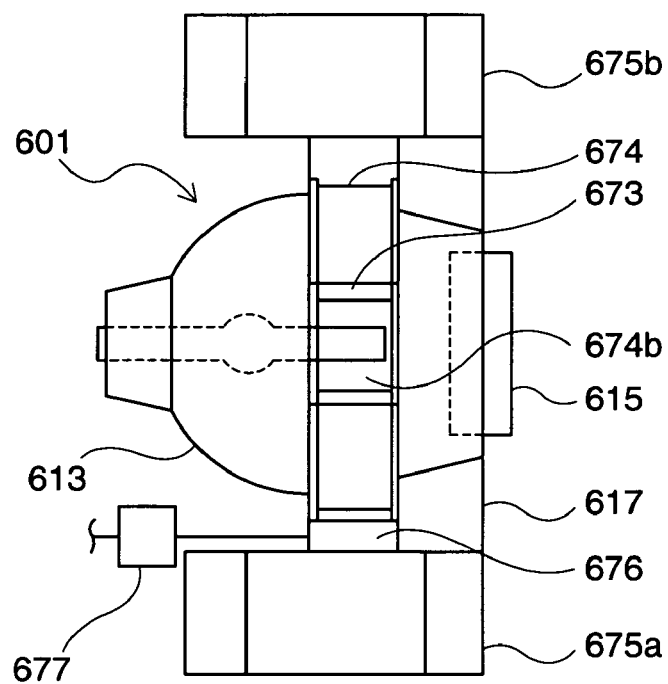
FIGS. 11A and 11B show a light source according to a fourth embodiment.
Figure 11B:
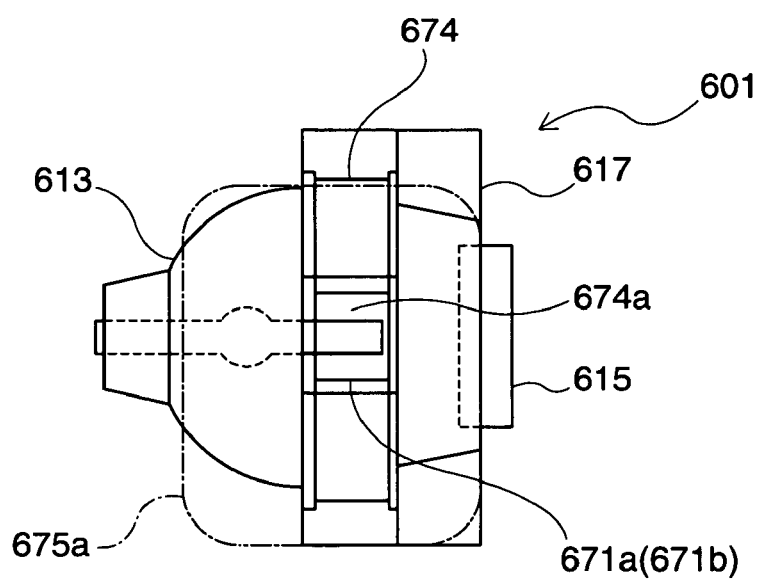

FIGS. 11A and 11B show a concept of a light source according to a fourth embodiment. A light source 601 according to this embodiment has a cooling system for cooling respective parts of a lamp main body 611. FIGS. 11A and 11B are views for explaining the cooling system. FIG. 11A is a side view schematically showing the left part of the light source 601 as viewed from the light emitting side, i.e., from the front. FIG. 11B is a bottom view schematically showing the light source 601. The optical structure of the light source 601 is similar to that structure in the first embodiment, and thus detailed explanation of parts other than the cooling system is not repeated.

The light source 601 includes a housing 617 for fixing a reflector 613 and a concave lens 615. The housing 617 has air supply ports 671a and 671b through which the inside and outside of the housing 617 communicate with each other at a position below a lamp main body 611 and a position opposed to the position below the lamp main body 611, i.e., a position above the lamp main body 611. While FIGS. 11A and 11B show the light source 601 installed in the normal condition, the light source 601 may be positioned upside down. Cooling fans 675a and 675b as external devices for generating cooling air are provided on the air supply ports 671a and 671b, respectively. The cooling fans 675a and 675b are sirocco fans, for example. An exhaust port 673 as an air hole through which the inside and outside of the housing 617 communicate with each other is formed on the left side surface as viewed from the light emitting side. i.e., from the front.

A shutter ring 674 for opening and closing the air supply ports 671a and 671b is provided inside the housing 617. The shutter ring 674 has a ring shape having a constant width. A plurality of openings 674a and 674b are formed on the side surface having the constant width at predetermined intervals to correspond to the air supply ports 671a and 671b and the exhaust port 673 of the housing 617. The center axis of the ring-shaped shutter ring 674 coincides with the optical axis of the lamp main body 611. The shutter ring 674 is axially rotatable around the optical axis of the lamp main body 611 in accordance with rotation of a cylindrical rotation driving device 676 engaging with the shutter ring 674 via a gear or the like (not shown) in response to a signal generated from a driving circuit 677. Thus, the rotation position of the shutter ring 674 is controlled such that a desired angle can be formed according to the signal from the driving circuit 677. Accordingly, the positions of the two openings 674a and 674b of the shutter ring 674 can be aligned with the air supply port 671a or 671b, or the exhaust port 673 by controlling the rotation position of the shutter ring 674.

Figure 12A:
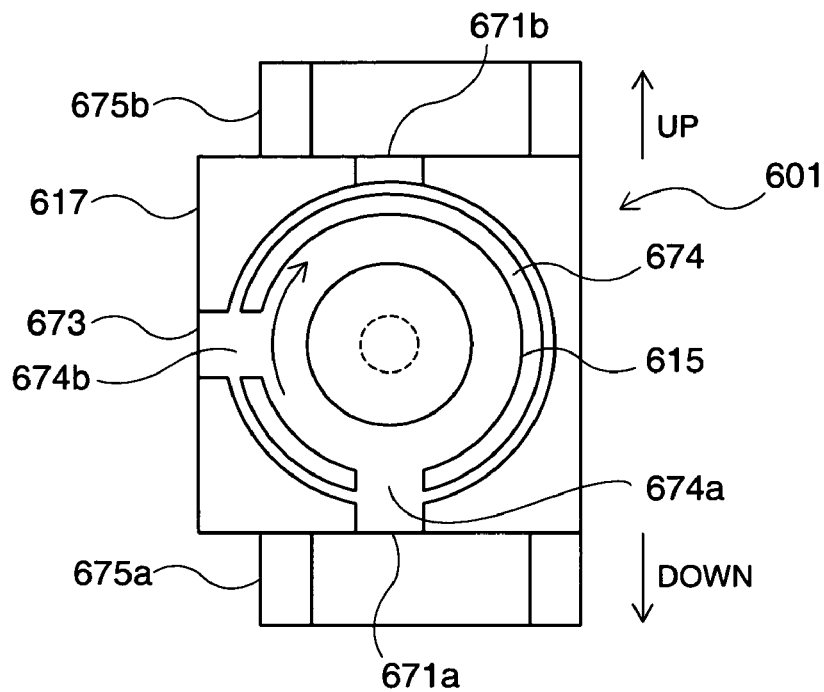
FIGS. 12A and 12B show operation of a light source according to a modified example.
Figure 12B:
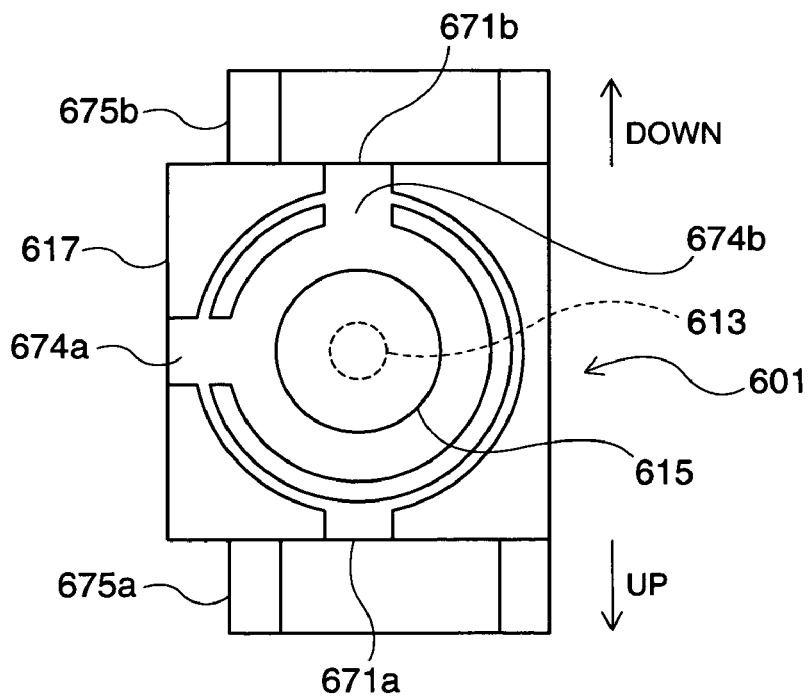

FIGS. 12A and 12B show the concept of the operation of the shutter ring 674. Both FIGS. 12A and 12B are front views schematically showing the light source 601 as viewed from the light emitting side, i.e., from the front. FIG. 12A shows the light source 601 installed in the normal condition, and FIG. 12B shows the light source 601 installed upside down. In FIGS. 12A and 12B, the up-down direction corresponds to the direction of gravity, and the downward direction indicated by an arrow is the direction of gravity. The opening 674a and the opening 674b of the shutter ring 674 are positioned such that the angle formed by the openings 674a and 674b is 90 degrees as viewed from the center axis of the shutter ring 674. When the light source 601 is installed in the normal condition as illustrated in FIG. 12A, the opening 674a in the pair of the openings 674a and 674b formed on the shutter ring 674 corresponds to the air supply port 671a, and the other opening 674b corresponds to the air exhaust port 673. In this case, cooling air is generated by the cooling fan 675a in the pair of the cooling fans 675a and 675b, and then the cooling air introduced from the air supply port 671a through the opening 674a is further guided from the area below the lamp main body 611 to the inside of the light source 601. Then, the cooling air cools the inside of the light source 601 and is exhausted from the exhaust port 673 through the opening 674b. In this condition, the air supply port 671b is closed by the side surface of the shutter ring 674.

When the light source 601 is installed upside down as illustrated in FIG. 12B, the upward direction in FIG. 12B corresponds to the direction of gravity, i.e., the downward direction. In this case, the shutter ring 674 is rotated clockwise through 90 degrees with respect to the light source 601 as illustrated in FIGS. 12A and 12B. As a result, the opening 674b in the pair of the openings 674a and 674b corresponds to the air supply port 671b, and the other opening 674a corresponds to the air exhaust port 673. In this case, cooling air is generated by the cooling fan 675b in the pair of the cooling fans 675a and 675b, and then the cooling air introduced from the air supply port 671b through the opening 674b is further guided from the area below the lamp main body 611 to the inside of the light source 601. Then, the cooling air cools the inside of the light source 601 and is exhausted from the exhaust port 673 through the opening 674a. In this condition, the air supply port 671a is closed by the side surface of the shutter ring 674. Thus, the opening 674b corresponds to the air supply port 671b below the lamp main body 611 when the light source 601 is installed upside down, and cooling can be appropriately performed similarly to the case when the light source 601 is installed in the normal condition.

Figure 13A:
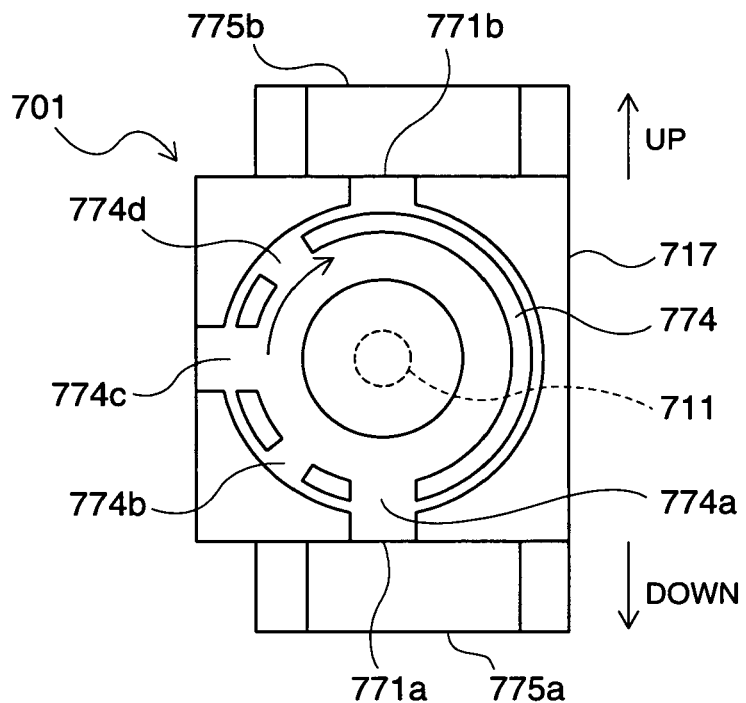
FIGS. 13A and 13B show operation of a light source according to another modified example.
Figure 13B:
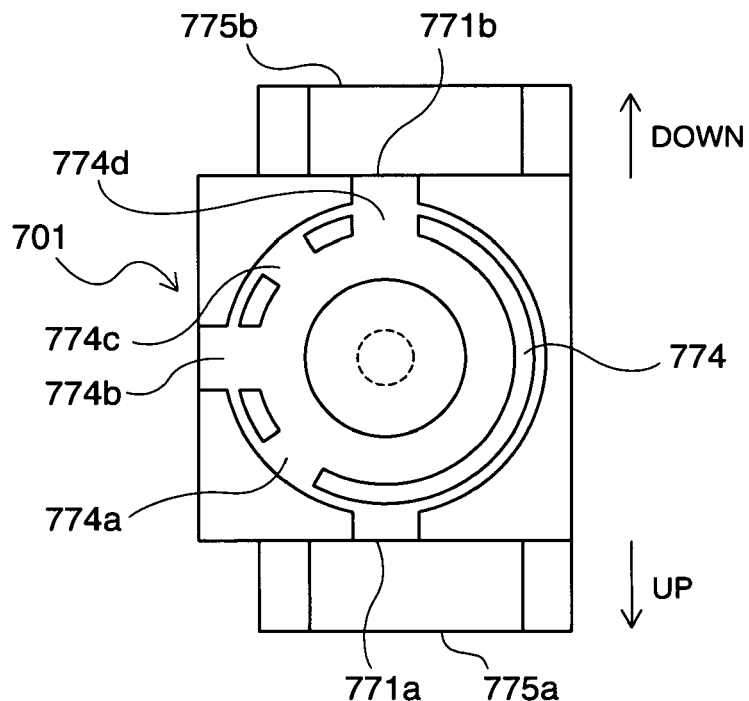

FIGS. 13A and 13B show a concept of a light source according to a modified example of this embodiment. Both FIGS. 13A and 13B are views for explaining the concept of the operation of a shutter ring 774. FIG. 13A shows a light source 701 installed in the normal condition, and FIG. 13B shows the light source 701 installed upside down. The up-down direction in FIGS. 13A and 13B are indicated by arrows. Four openings 774a, 774b, 774c and 774d are formed on the shutter ring 774 of the light source 701 in this modified example at predetermined intervals at positions corresponding to air supply ports 771a, 771b, and an air exhaust port 773. The structures of the light source 701 other than the positions of the plural openings 774a, 774b, 774c and 774d are similar to those in the light source 601 shown in FIGS. 11A and 11B and FIGS. 12A and 12B, and the same explanation is not repeated herein.

The openings 774a, 774b, 774c and 774d of the shutter ring 774 are disposed at intervals of 45 degrees as viewed from the center axis of the shutter ring 774. Thus, the openings 774a and 774c are positioned at the interval of 90 degrees as viewed from the center axis of the shutter ring 774, for example. When the light source 701 is installed in the normal condition as illustrated in FIG. 13A, the opening 774a of the shutter ring 774 corresponds to the air supply port 771a, and the opening 774c corresponds to the air exhaust port 773. In this case, cooling air introduced from the air supply port 771a through the opening 774a by the cooling fan 775a in the pair of the cooling fans 775a and 775b as the external devices is guided toward the inside of the light source 701. Then, the cooling air cools the lamp main body 711 and is exhausted from the exhaust port 773 through the opening 774c. In this condition, the air supply port 771b is closed by the side surface of the shutter ring 774. Also, the openings 774b and 774d are closed by the inside wall of a housing 717.

When the light source 701 is installed upside down as illustrated in FIG. 13B, the shutter ring 774 is rotated clockwise through 45 degrees with respect to the light source 701 as illustrated in FIGS. 13A and 13B. As a result, the opening 774d corresponds to the air supply port 771b, and the opening 774b corresponds to the air exhaust port 773. In this case, cooling air is generated by the cooling fan 775b in the pair of the cooling fans 775a and 775b, and then the cooling air introduced from the air supply port 771b through the opening 774d is further guided to the inside of the light source 701. Then, the cooling air exhausted from the exhaust port 773 through the opening 774b. In this condition, the air supply port 771a is closed by the side surface of the shutter ring 774. Also, the openings 774a and 774c are closed by the inner wall of the housing 717. Thus, the opening 774b corresponds to the air supply port 771b below the lamp main body 711 when the light source 701 is installed upside down, and cooling can be appropriately performed similarly to the case when the light source 701 is installed in the normal condition.

Fifth Embodiment

Figure 14:
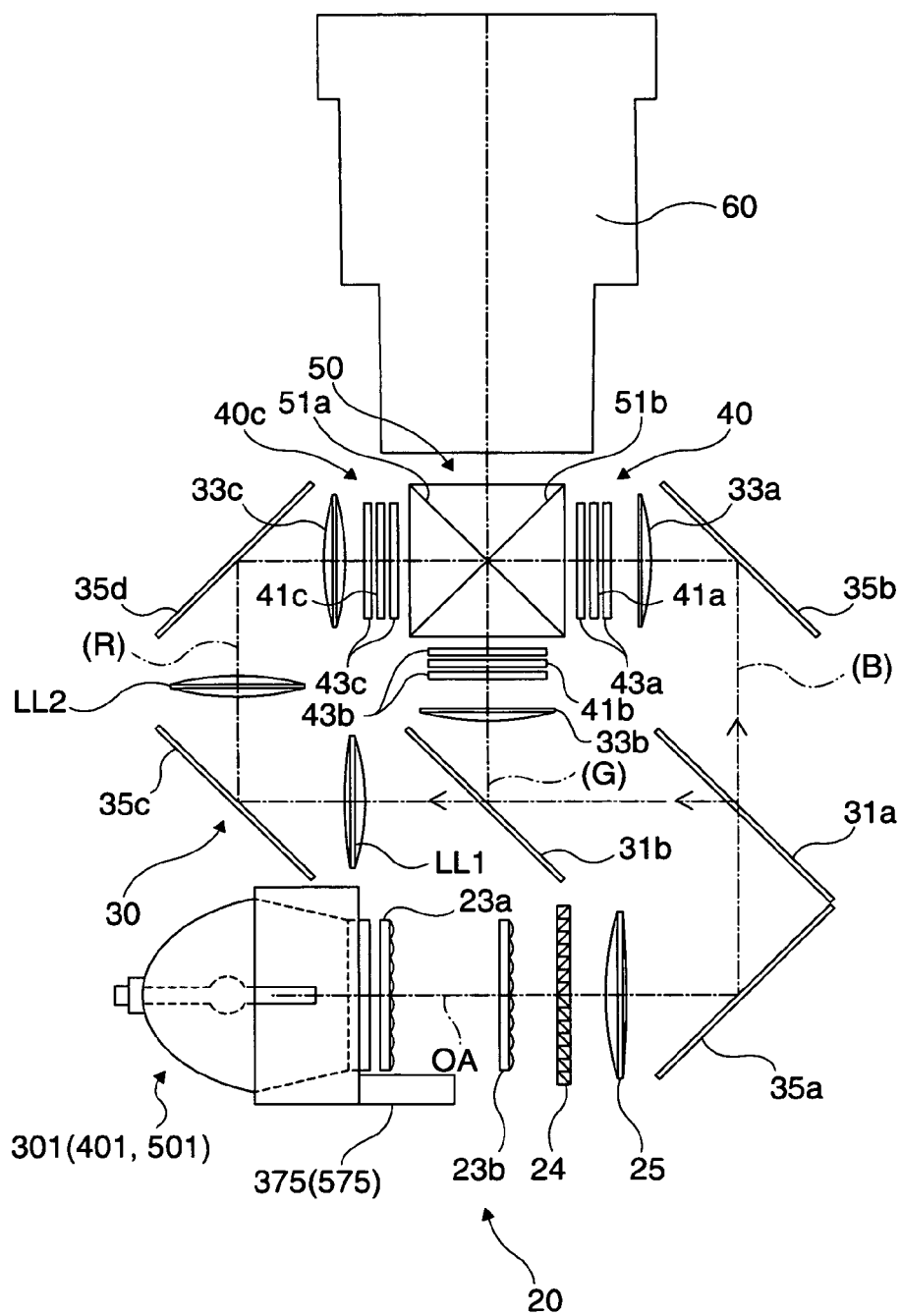
FIG. 14 shows a concept of a structure of optical systems included in a projector according to a fifth embodiment which contains the light source according to the third embodiment.

FIG. 14 shows a concept of a structure of optical systems included in a projector which contains the light source according to the third embodiment. A projector 800 in this embodiment incorporates the light source 301 (401, 501) in lieu of the light source 1 included in the projector 200 shown in FIG. 7. Thus, optical systems other than the light source 301 (401, 501) are similar to those included in the projector 200 in FIG. 7, and the same explanation is not repeated. The projector 800 uses the light source 301 (401, 501) as a light source and thus contains a long-life light source, and is also capable of being installed not only in the normal condition but also in the upside-down condition as a suspension type from the ceiling. In this embodiment, the cooling fan 375 (575) is attached on the projector 800 side, and the air supply port of the cooling fan 375 (575) comes opposed to the air supply port of the light source 301 (401, 501) when the light source 301 (401, 501) is incorporated in the projector 800. When the cooling fan 375 (575) is a relatively small sirocco fan or the like, the light source can be disposed without blocking the optical path of the subsequent optical system. It is possible to employ the light source according to the fourth embodiment as the light source included in the projector. For example, the light source 601 shown in FIGS. 11A and 11B or the like may be disposed in place of the light source 301. In this case, the cooling fans 675a, 675b and the like are attached to the projector 800 such that the light source 601 or the like can be appropriate for the projector 800. The projector 800 in this embodiment can use optical systems equivalent to those of the projector 200 shown in FIG. 7. Thus, the first lens array 23a and the second lens array 23b can be replaced with a rod integrator, and the structure of the projector 800 is applicable to a projector having four or a larger number of liquid crystal panels to perform light modulation. Furthermore, other modifications may be made similarly to the case of the second embodiment. It is possible to attach the cooling fans 375, 401, 575, 675a and 675b to the light source 301. There are a front type projector which projects images in the same direction as the direction for observing the screen, and a rear type projector which projects images in the direction opposite to the screen observing direction. The structure according to this embodiment is applicable to both of these types of projector.

The entire disclosure of Japanese Patent Application No. 2007-055912, filed Mar. 6, 2007 and No. 2007-278537, filed Oct. 26, 2007 are expressly incorporated by reference herein.

What is claimed is:

1. A light source, comprising:
an arc tube which emits light;
a reflector which reflects the light emitted from the arc tube; and
a holding unit which holds the reflector,
wherein:
the holding unit has plural air supply ports through which cooling air is introduced into the light source on the light emitting side of the arc tube, and a first rectifying portion which guides cooling air having been supplied from an air supply port of the plural air supply ports and passed through the light emitting side of the arc tube toward an area above the arc tube,
the holding unit has a switching unit which changes the flow of cooling air by opening or closing the plural air supply ports,
the switching unit has a shutter ring for opening and closing the plural air supply ports, the shutter ring having plural openings disposed at positions corresponding to the plural air supply ports located below the arc tube and an air hole through which cooling air is exhausted,
the switching unit changes the flow of cooling air by rotation of the shutter ring which locates an opening of the plural openings of the shutter ring at a position corresponding to the air supply port of the plural air supply ports disposed below the arc tube.

2. The light source according to claim 1, wherein:
the arc tube contains a light emitting portion and sealing portions extending to both sides of the light emitting portion; and
the air supply port has a second rectifying portion which guides cooling air introduced into the light source toward the light emitting side of the arc tube.

3. The light source according to claim 1, wherein the reflector has an ellipsoidal reflection surface.

4. The light source according to claim 1, wherein the holding unit has an air exhaust port through which cooling air is exhausted at a position in the vicinity of the side of the arc tube.

5. The light source according to claim 1, wherein:
the first rectifying portion is disposed above the arc tube; and
the air supply port is located at a position below the arc tube and opposed to the first rectifying portion.

6. The light source according to claim 1, wherein the first rectifying portion is a curved surface or inclined surface formed on the inner wall of the holding unit.

7. A projector, comprising:
the light source according to claim 1.

8. The projector according to claim 7, wherein:
the arc tube contains a light emitting portion and sealing portions extending to both sides of the light emitting portion; and
the air supply port has a second rectifying portion which guides cooling air introduced into the light source toward the light emitting side of the arc tube.

9. The projector according to claim 7, wherein the reflector has an ellipsoidal reflection surface.

10. The projector according to claim 7, wherein the holding unit has an air exhaust port through which cooling air is exhausted at a position in the vicinity of the side of the arc tube.

11. The projector according to claim 7, wherein:
the first rectifying portion is disposed above the arc tube; and
the air supply port is located at a position below the arc tube and opposed to the first rectifying portion.

12. The projector according to claim 7, wherein the first rectifying portion is a curved surface or inclined surface formed on the inner wall of the holding unit.

* * * * *